UNITED STATES PATENT OFFICE.

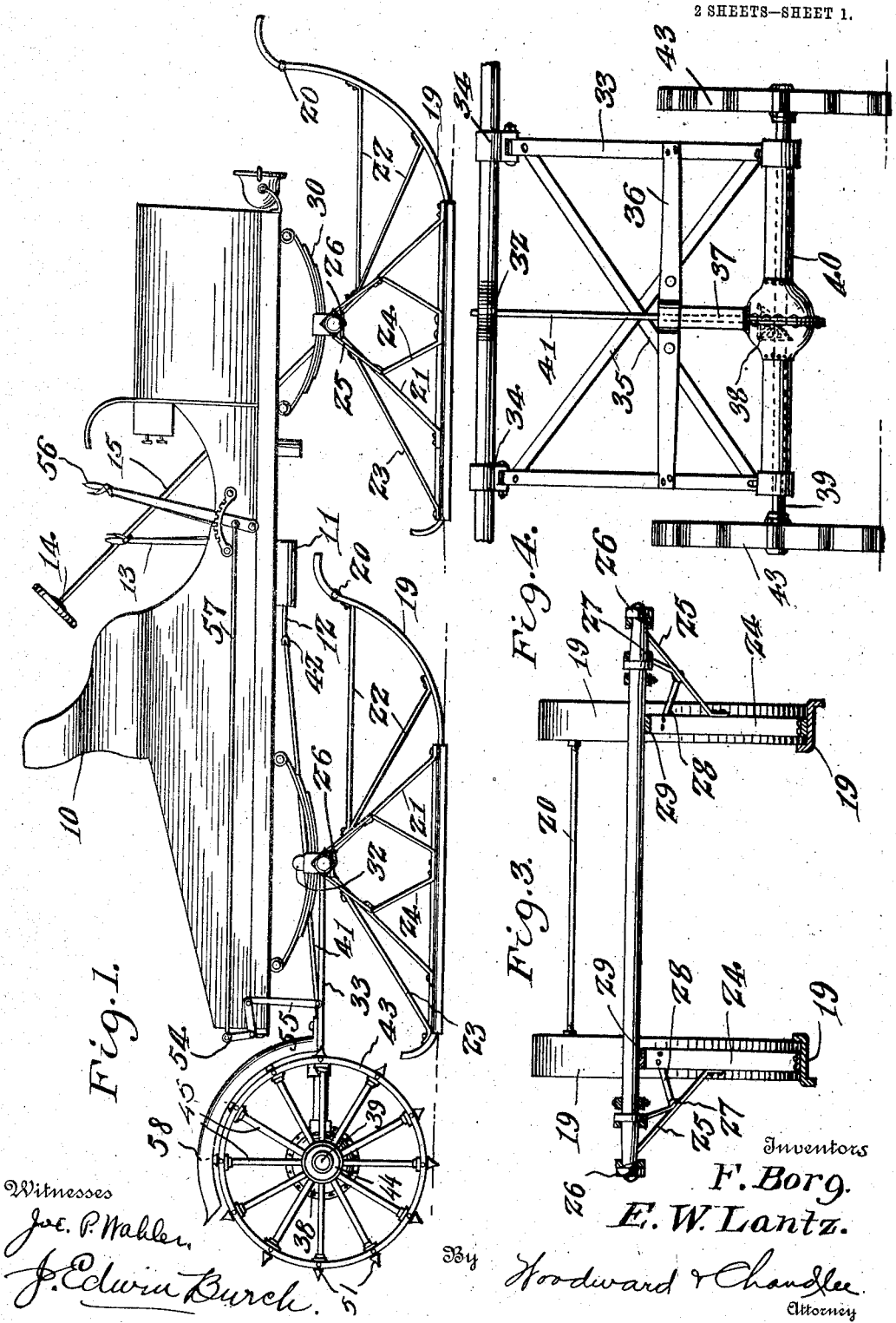

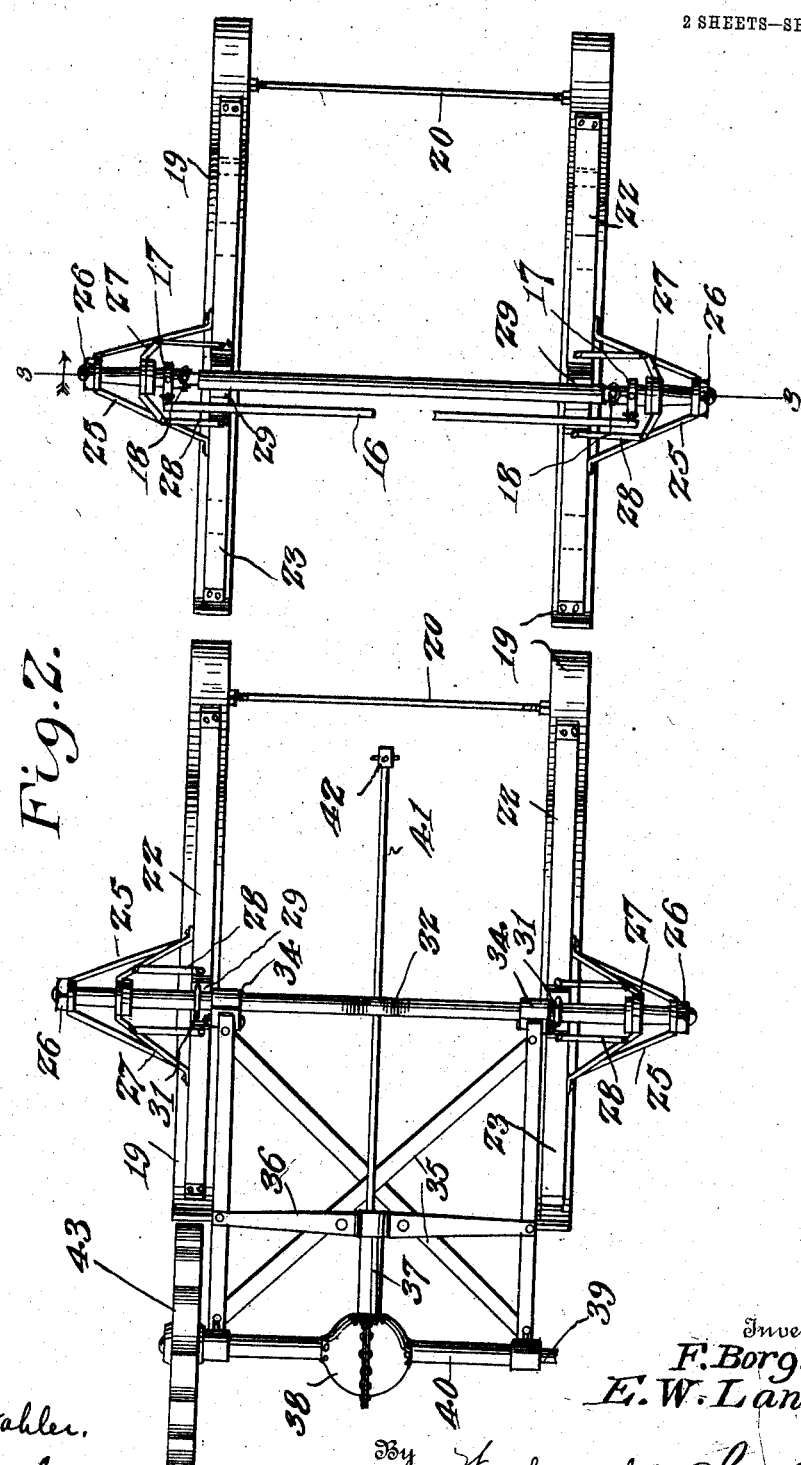

FRED BORG AND EDGAR W. LANTZ, OF HANNAH, NORTH DAKOTA.

SNOWMOBILE ATTACHMENT.

1,015,270.  Specification of Letters Patent.  Patented Jan. 16, 1912.

Application filed May 19, 1910, Serial No. 562,213.  Renewed December 11, 1911.  Serial No. 665,372.

*To all whom it may concern:*

Be it known that we, FRED BORG and EDGAR W. LANTZ, citizens of the United States, residing at Hannah, in the county of Cavalier and State of North Dakota, have invented certain new and useful Improvements in Snowmobile Attachments, of which the following is a specification.

This invention relates to snowmobile attachments for wheeled vehicles and it consists of an ordinary automobile body provided with a front guiding sled and a rear stationary sled in lieu of the ordinary wheels, a suitable power motor carried by the body having suitable controlling means, a propelling means carried upon the rear axle and pivoted thereto, and means for raising and lowering said propelling means to place the same into and out of contact with the surface over which the vehicle travels.

An object of the invention is the provision of novel means for securing the front sled in pivotal relation to the front axle without any reconstruction thereof as compared with the usual structure of such devices and also for rigidly securing the rear sled to the rear axle.

Another object is to provide a novel manner of securing a suitable propelling means upon the rear axle in pivotal relation thereto and having operative connections with the motor by which said means, preferably in the form of traction wheels, are driven and controlled.

A still further object is to provide means for raising and lowering said propelling means and also to provide a suitable cover therefor.

Other objects and advantages will be apparent from the following description, and it will be understood that changes in the specific structure shown and described may be made within the scope of the claims without departing from the spirit of the invention.

Referring to the drawings: Figure 1 is a side elevation of our improved snowmobile, Fig. 2 is a plan view of the device with the body removed, and the steering rod broken away, Fig. 3 is a transverse sectional view on the line 3—3 of Fig. 2, showing the manner of securing the front sled to the axle thereof, Fig. 4 is a detail view of the supporting frame for the propelling wheels, showing a fragment of the rear axle in top plan.

In the accompanying drawings, like characters denote like parts in the several views and in said drawings the numeral 10 designates the body of the vehicle to which our invention is applied and may be of any suitable construction, a gasolene or other motor 11 being suitably carried thereby and having the usual propelling shaft 12, for a purpose to be hereinafter made more clearly apparent. The particular form of motor and means for controlling the same from the driver's seat may be of any well known construction but we have shown an operating lever 13 for said motor but as the specific construction thereof forms no important feature of the present invention, further disclosure thereof is not made.

Conveniently positioned in front of the driver's seat is the usual steering wheel 14 having a suitable standard 15 properly connected to the steering rods 16 and 17, said latter rods being connected to the usual front steering axle of the vehicle, though the same is shown as having its end portions connected to the main central portion of the axle by suitable vertical pivot connections 18, so that the vehicle may be guided in the desired direction.

The front or steering sled is rigidly connected to the vertically pivoted end portions of the front axle and as shown comprises the runners 19 which are of the usual design but are preferably constructed of metal and as is more clearly shown in Fig. 3 of the drawings, said runners have their longitudinal edges bent in opposite directions, the outer edges being turned upwardly and the inner edges downwardly or vice-versa as shown, so that the runners may glide over the snow or icy surface but by reason of the downturned edges, will be prevented from skidding especially when the vehicle is traveling over uneven or sloping surfaces.

The runners are provided with flexible connecting rods 20 which are swivelly connected to the forward upper ends of the runners and are provided for bracing the same against independent outward movement. Disposed centrally of the length of the contacting portions of the runners and secured thereto are the inverted V-shaped brace members 21 which are rigidly held in position by means of the forward brace arms 22 disposed one above the other and connected to the members 21 and the upturned front portions of the runners and also by means of the rearwardly extended brace arms 23 which are similarly secured to the members 21 and to the rear ends of the runners. We also provide the U-shaped braces 24 which are positioned between the arms of the inverted V-shaped members 21 and properly secured to the runner and said arms, said members 21 of the runners being rigidly secured to the ends of the front axle, so that the runners will be moved in the proper direction according to the direction of movement given to the pivotally mounted ends of the axle communicated thereto through the rotation of the steering wheel and the intermediate parts connecting the same. For this purpose we provide the diagonal supporting arms 25 which are secured to the arms of the members 21 at the point of connection of the members 24 thereto and are also rigidly secured to the axles adjacent their outer ends and retained in place thereon by means of the usual securing nuts 26, said supporting arms 25 being rigidly braced by means of the vertical arms 27 which are also rigidly connected to the pivotally mounted ends of the front axles adjacent their connection with the main central portion thereof, and said supporting arms are securely retained in position by means of the rods 28 which are secured to the arms 25 at the points of connection of the arms 27 and also to the members 21 adjacent the upper portions thereof. It is therefore obvious that the runners are operated in a similar manner as the wheels of an ordinary automobile and in order that they may have a free pivotal movement the upper portions of the members 21 are provided with a flat bearing surface 29 so that as the outer ends of the axle are swung forwardly or rearwardly through the steering rods, said bearing surfaces 29 will slide under the axle and may be lubricated to reduce friction therebetween. The rear sled is constructed similarly to the front sled and both of said sleds are properly secured to the body of the vehicle with intermediate springs 30, but as shown, the upper portion of the inverted V-shaped members 21 are rigidly secured to the axle by means of the staples 31 and the central portion of the axle is bowed upwardly as shown at 32, for a purpose to be hereinafter more fully described.

The frame upon which the propeller wheels are mounted, comprises the side arms 33 which are pivotally connected to the rear axle a short distance inwardly of each end by means of the clamps 34 which allow of the ready detachment thereof if necessary. Said side arms are rigidly braced and held in parallel relation by means of the cross braces 35 which are extended diagonally from the opposite ends of the respective arms and a drive and differential gear casing is carried at the rear ends of the arms. This casing comprises the bearing strap 36, extended rearwardly of which there is the tubular sleeve 37 which terminates in the enlarged portion 38 and adapted to contain the proper gearing, as indicated in dotted lines in Fig. 4 of the drawings and the drive axle 39 is revoluble in the extensions 40 of the gear casing which are rigidly secured to the side arms 33.

The axle 39 has operative connection with the motor 11 by means of the intermediate shaft 41 which is provided with a universal coupling 42 so that said shaft will compensate for the unevenness of the surface traveled over and may drop out of the bowed portion 32 of the rear axle should the propeller wheels be disposed in a lower grade or move upwardly into said bowed position when raised.

Rigidly keyed upon each end of the axle 29 are the propeller wheels 43, which comprise the usual hubs 44, spokes 45 secured thereto, and enlarged engaging heads 51 of knife form.

In the use of the propelling device the wheels are normally in contact with the surface but it is necessary at times to elevate the same and for this purpose we provide the bell-crank lever 54 which is pivotally mounted upon the body of the vehicle at one side thereof, one arm of the lever being connected to one of the side arms 33 by means of the link 55 and the other arm of the lever being connected and operated by the usual controlling lever 56 by means of the rod 57, so that movement of the controlling lever in either direction will transmit motion to the bell-crank lever to raise or lower the propeller frame and wheels thereof as desired. The propeller wheels are also provided with a suitable cover 58 which is rigidly carried by the propeller frame of the vehicle in any desirable manner.

From the foregoing description it will be seen that we have provided an automobile sleigh which can be very cheaply manufactured as a whole or the attachment may be provided separately and sold as such and by reason of its simplicity and efficiency in operation may be readily applied to vehicles of the usual type.

What is claimed is:

1. The combination with a vehicle body having a rigid rear axle and a front steering axle and means for operating the same; of sleds correspondingly carried by said axles, the runners of said steering sled being connected at their forward ends, a motor carried by said body and having suitable controlling means, a frame pivotally mounted upon the rear axle, a drive axle rotatably mounted at the rear end of said frame, propeller wheels rigidly carried at the ends of said drive axle, said rear axle having an intermediate bowed portion and a power shaft operatively connected with the drive axle and having a universal connection with the shaft of the motor whereby it will be permitted movement downwardly out of the bowed portion of the rear axle.

2. The combination with the usual automobile body having a rigid rear axle and a front steering axle provided with steering means; of sleds secured to said axles, a frame structure pivotally secured at the rear of the body and comprising side arms and cross braces connecting said arms, a gear casing at the rear ends of said arms, a drive axle rotatable therein, a motor carried by the vehicle, geared connections between the motor and the drive axle, drive wheels secured to the ends of the drive axle in alinement with the runners of the rear sled, means for disposing said traction wheels into and out of engagement with the surface traveled over and a cover for said frame, said cover being carried thereby.

In testimony whereof we affix our signatures, in presence of two witnesses.

FRED BORG.
EDGAR W. LANTZ.

Witnesses:
 ALEXANDER REID,
 HENRY EDWARD FAY.